(12) United States Patent
Chi et al.

(10) Patent No.: US 11,139,523 B2
(45) Date of Patent: Oct. 5, 2021

(54) BATTERY CELL FRAME AND BATTERY MODULE COMPRISING SAME

(71) Applicant: LG Chem, Ltd., Seoul (KR)

(72) Inventors: Ho-June Chi, Daejeon (KR); Dal-Mo Kang, Daejeon (KR); Jeong-O Mun, Daejeon (KR); Jin-Yong Park, Daejeon (KR); Jung-Hoon Lee, Daejeon (KR)

(73) Assignee: LG Chem, Ltd.

( * ) Notice: Subject to any disclaimer, the term of this patent is extended or adjusted under 35 U.S.C. 154(b) by 252 days.

(21) Appl. No.: 16/482,874

(22) PCT Filed: Jun. 18, 2018

(86) PCT No.: PCT/KR2018/006860
§ 371 (c)(1),
(2) Date: Aug. 1, 2019

(87) PCT Pub. No.: WO2019/031702
PCT Pub. Date: Feb. 14, 2019

(65) Prior Publication Data
US 2019/0355947 A1 Nov. 21, 2019

(30) Foreign Application Priority Data

Aug. 8, 2017 (KR) .................. 10-2017-0100477

(51) Int. Cl.
*H01M 4/02* (2006.01)
*H01M 50/20* (2021.01)
(Continued)

(52) U.S. Cl.
CPC ......... *H01M 50/20* (2021.01); *H01M 10/655* (2015.04); *H01M 50/502* (2021.01)

(58) Field of Classification Search
CPC ....................................................... H01M 4/02
See application file for complete search history.

(56) References Cited

U.S. PATENT DOCUMENTS

2010/0266889 A1* 10/2010 Kim .................... H01M 50/502
429/158
2011/0097607 A1 4/2011 Park et al.
(Continued)

FOREIGN PATENT DOCUMENTS

CN 204464344 U 7/2015
JP 2009272234 A 11/2009
(Continued)

OTHER PUBLICATIONS

International Search Report for PCT/KR2018/006860 dated Oct. 2, 2018.
(Continued)

*Primary Examiner* — Jacob B Marks
(74) *Attorney, Agent, or Firm* — Lerner, David, Littenberg, Krumholz & Mentlik, LLP (57) ABSTRACT

A battery cell frame according to an embodiment of the present disclosure includes a bus bar for electrically coupling to an electrode lead of a battery cell, a support member coupled to the bus bar and configured to come into contact with the battery cell to support the battery cell, and a variable length part formed in the support member. The variable length part is configured to change in length to fit a size of the battery cell.

14 Claims, 10 Drawing Sheets

(51) Int. Cl.
H01M 10/655 (2014.01)
H01M 50/502 (2021.01)

(56) References Cited

U.S. PATENT DOCUMENTS

| | | |
|---|---|---|
| 2011/0104556 A1 | 5/2011 | Kim et al. |
| 2014/0038015 A1 | 2/2014 | Kwon et al. |
| 2015/0303415 A1 | 10/2015 | Kayano et al. |
| 2016/0036028 A1 | 2/2016 | Tsuruta et al. |

FOREIGN PATENT DOCUMENTS

| | | |
|---|---|---|
| JP | 2011108377 A | 6/2011 |
| JP | 2013254642 A | 12/2013 |
| JP | 2014203763 A | 10/2014 |
| JP | 2016024935 A | 2/2016 |
| JP | 2016033905 A | 3/2016 |
| JP | 2016054127 A | 4/2016 |
| JP | WO2014073443 A1 | 9/2016 |
| KR | 20110045235 A | 5/2011 |
| KR | 20130020590 A | 2/2013 |
| KR | 20150095297 A | 8/2015 |
| KR | 20150134673 A | 12/2015 |
| KR | 20160012021 A | 2/2016 |
| KR | 20170067012 A | 6/2017 |

OTHER PUBLICATIONS

Extended European Search Report including Written Opinion for EP18845031.6 dated Apr. 3, 2020; 8 pages.

\* cited by examiner

BATTERY CELL FRAME AND BATTERY MODULE COMPRISING SAME

CROSS-REFERENCE TO RELATED APPLICATIONS

The present application is a national phase entry under 35 U.S.C. § 371 of International Application No. PCT/KR2018/006860, filed Jun. 18, 2018, which claims priority from Korean Patent Application No. 10-2017-0100477 filed on Aug. 8, 2017, the disclosures of which are incorporated herein by reference in their entirety.

TECHNICAL FIELD

The present disclosure relates to a battery cell frame and a battery module including the same, and more particularly, to a battery cell frame that can be modularized and used for common purpose and a battery module including the same.

BACKGROUND ART

With the increasing technology development and demand for mobile devices, the demand for secondary batteries as an energy source has dramatically increased. Nickel cadmium batteries or hydrogen ion batteries have been used historically as secondary batteries, while lithium secondary batteries have little or no memory effect and have advantages of free charging/discharging, very low self-discharging and high energy density compared to nickel-based secondary batteries, and thus they have been widely used in recent years.

A lithium secondary battery usually uses a lithium-based oxide and a carbon material for a positive electrode active material and a negative electrode active material, respectively. The lithium secondary battery includes an electrode assembly including a positive electrode plate and a negative electrode plate coated with the positive electrode active material and the negative electrode active material, respectively, with a separator interposed between, and a packaging or a battery case to hermetically receive the electrode assembly therein together with an electrolyte solution.

The lithium secondary battery includes the positive electrode, the negative electrode with the separator interposed between and the electrolyte, and is classified into a lithium ion battery (LIB) and a polymer lithium ion battery (PLIB) according to the positive and negative electrode active materials used. Generally, the electrode of the lithium secondary batteries is formed by applying the positive or negative electrode active material to a current collector of an aluminum or copper sheet, a mesh, a film and a foil and drying it.

Figure 1:
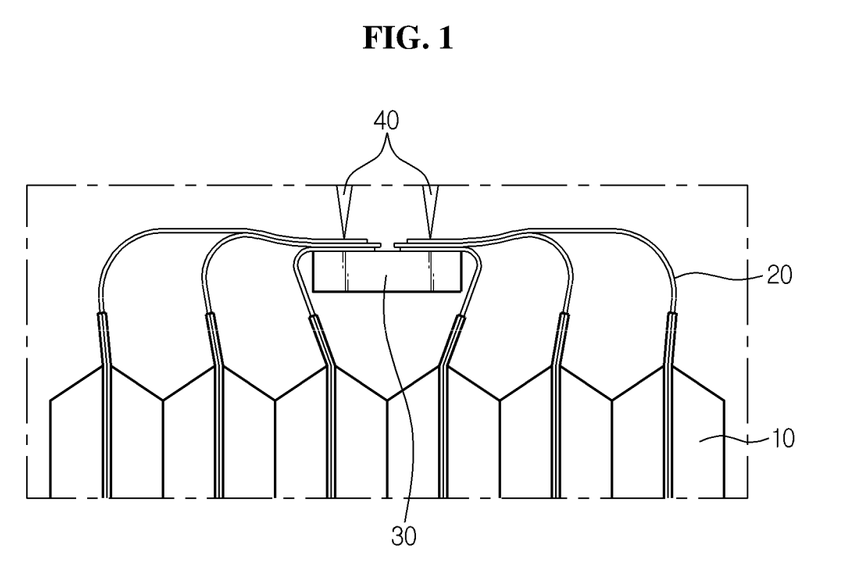
FIG. 1 is a diagram showing that electrode leads provided in a conventional battery cell and a bus bar are electrically coupled.

FIG. 1 is a diagram showing that electrode leads provided in a conventional battery cell and a bus bar are electrically coupled. Referring to FIG. 1, in the case of conventional art, electrode leads 20 provided in each of a plurality of battery cells 10 are bent and brought into contact with a bus bar 30 surface and coupled through welding 40. In this case, many operators' manual operations are required to keep the electrode leads 20 in a bent shape, the electrode leads 2 and the bus bar 3 do not come into close contact with each other due to the elastic resilience of the metal electrode leads 2, and after the plurality of electrode leads 2 overlap at a point of the bus bar 3, they are welded 4, resulting in reduced weldability.

Additionally, because the battery cell comes in various sizes, frames in different sizes are necessary for each size of the battery cell, resulting in reduced productivity, and after the battery cell is assembled in the frame, thermal resin is introduced, and thus there is a high error ratio problem.

DISCLOSURE

Technical Problem

Therefore, the present disclosure is directed to providing a battery cell frame that allows battery cells in various sizes to each be coupled to one frame and a battery module including the same.

The present disclosure is further directed to providing a battery cell frame in which a thermal interface material with which a battery cell comes into contact is coupled at a reduced error ratio and a battery module including the same.

The present disclosure is further directed to providing a battery module having improved weldability with no overlap in electrode leads and a battery pack including the same.

Technical Solution

According to an aspect of the present disclosure, there is provided a battery cell frame including a bus bar which is electrically coupled to an electrode lead of a battery cell, a support member which is coupled to the bus bar and with which the battery cell comes into contact to support the battery cell, and a variable length part formed in the support member and which changes in length to fit a size of the battery cell.

Additionally, the variable length part may include a first variable length part which changes in length in a short side direction of the support member, and a second variable length part which changes in length in a long side direction of the support member.

Additionally, the first variable length part may include a fixed part which is fixedly coupled to one side of the bus bar, and a moveable part which is moveably coupled to the other side of the bus bar at a location facing the fixed part.

Additionally, the bus bar may include an electrical connection part to which the electrode lead of the battery cell is coupled, a first coupling part which extends to one side of the electrical connection part, and to which the fixed part is coupled, and a second coupling part which extends to the other side of the electrical connection part, and to which the moveable part is coupled.

Additionally, the bus bar may be coupled to the fixed part and the moveable part at a location that deviates from a center of the fixed part and a center of the moveable part on the basis of height of the fixed part and the moveable part.

Additionally, the bus bar may be coupled to the fixed part and the moveable part below the center of the fixed part and the center of the moveable part.

Additionally, the second variable length part may have a spiral spring that can shrink and expand by storing energy from rotation or twist.

Additionally, a thermal interface material (TIM) may be coupled to the second variable length part to transfer heat.

Additionally, the thermal interface material may be coupled to a spiral spring which is in an expanded state.

Additionally, the thermal interface material may be coupled around at least a portion of the spiral spring.

According to another aspect of the present disclosure, there is provided a battery module including the above-described battery cell frame, and a battery cell which is electrically coupled to the bus bar of the battery cell frame and comes into contact with the support member of the battery cell frame, wherein a plurality of battery cells is provided and stacked on one another.

Additionally, an electrode lead of the battery cell may be stepped and coupled to the bus bar.

Meanwhile, according to still another aspect of the present disclosure, there is provided a battery pack including the above-described battery module and a vehicle including the above-described battery module.

Advantageous Effects

According to the embodiments of the present disclosure, a frame has a variable length part that changes in length to fit the size of a battery cell, which results in the benefit that battery cells of various sizes can each be coupled to one frame.

Additionally, after changing the length of a second variable length part, a thermal interface material is coupled to the second variable length part and comes into contact with the battery cell, which beneficially reduces the error ratio.

Further, a plurality of electrode leads are coupled to a respective plurality of bus bars to avoid overlap of the electrode leads, which thus improves weldability.

BRIEF DESCRIPTION OF THE DRAWINGS

FIGS. 5(*a*) and 5(*b*) are diagrams showing a length change by a first variable length part in the battery cell frame of FIG. 4.

BEST MODE

Hereinafter, preferred embodiments of the present disclosure will be described in detail with reference to the accompanying drawings. It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time the application was filed.

In the drawings, the size of each element or specific parts of the elements is exaggerated, omitted or schematically shown for convenience of description and clarity. Accordingly, the size of each element does not entirely reflect its actual scale. When it is deemed that a detailed description of relevant known functions or elements renders the subject matter of the present disclosure ambiguous, the detailed description is omitted herein.

It should be further understood that the term "couple" or "connect" refers to an element being directly coupled or connected to another element as well as indirectly coupled or connected through intervening elements.

Figure 2:
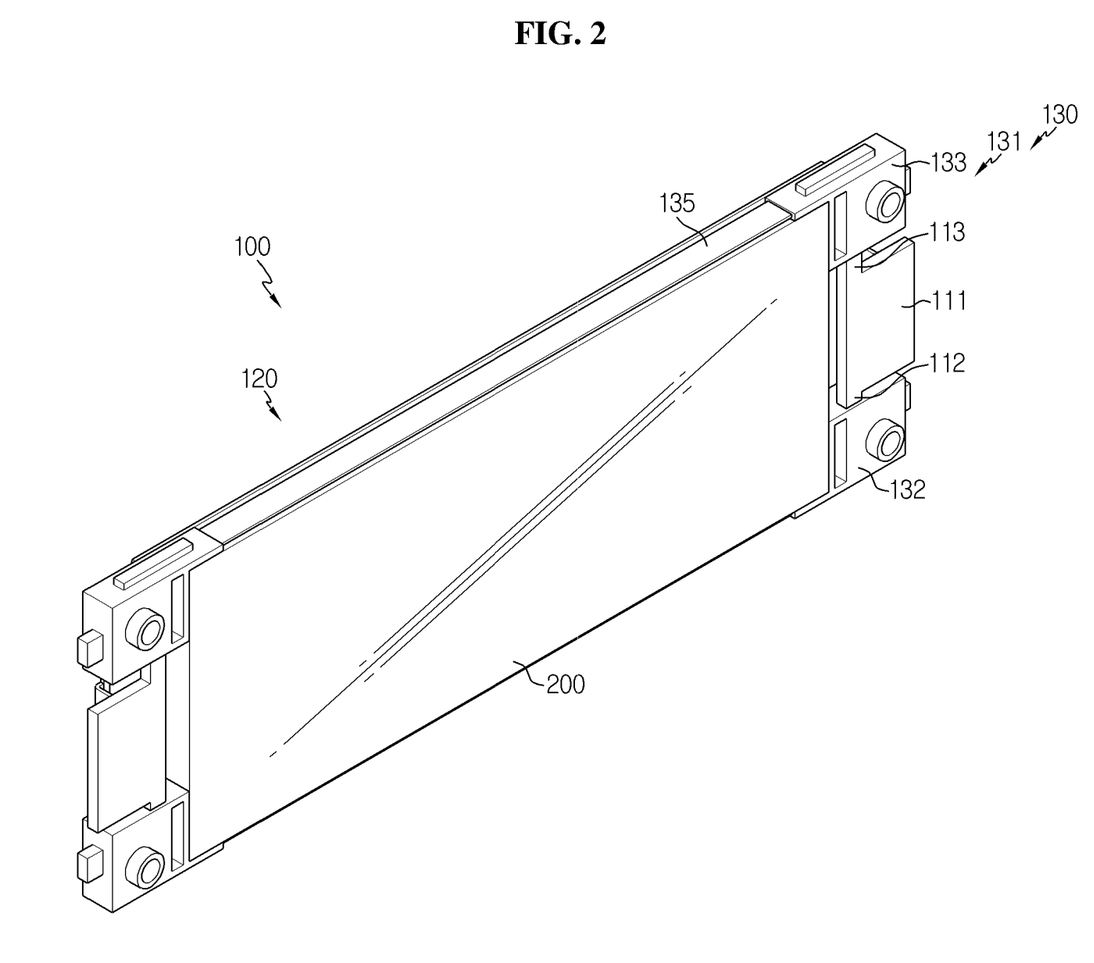
FIG. 2 is a full perspective view schematically showing a battery cell coupled to a battery cell frame according to an embodiment of the present disclosure.
Figure 3:
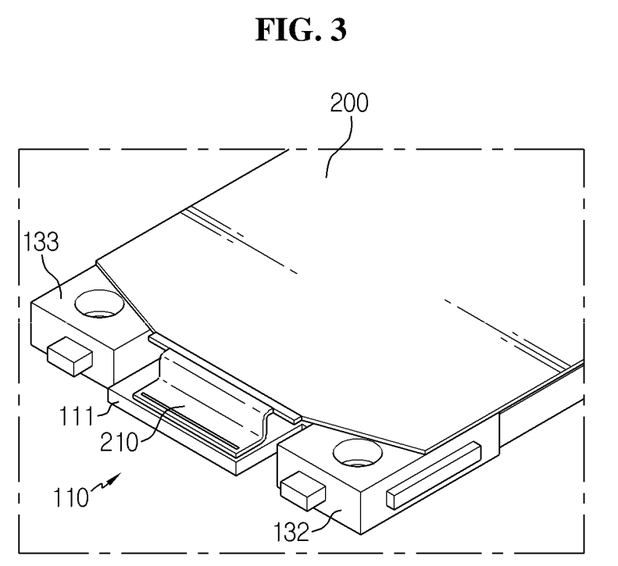
FIG. 3 is a perspective view showing an electrode lead coupled to a bus bar in a battery cell frame according to an embodiment of the present disclosure.
Figure 4:
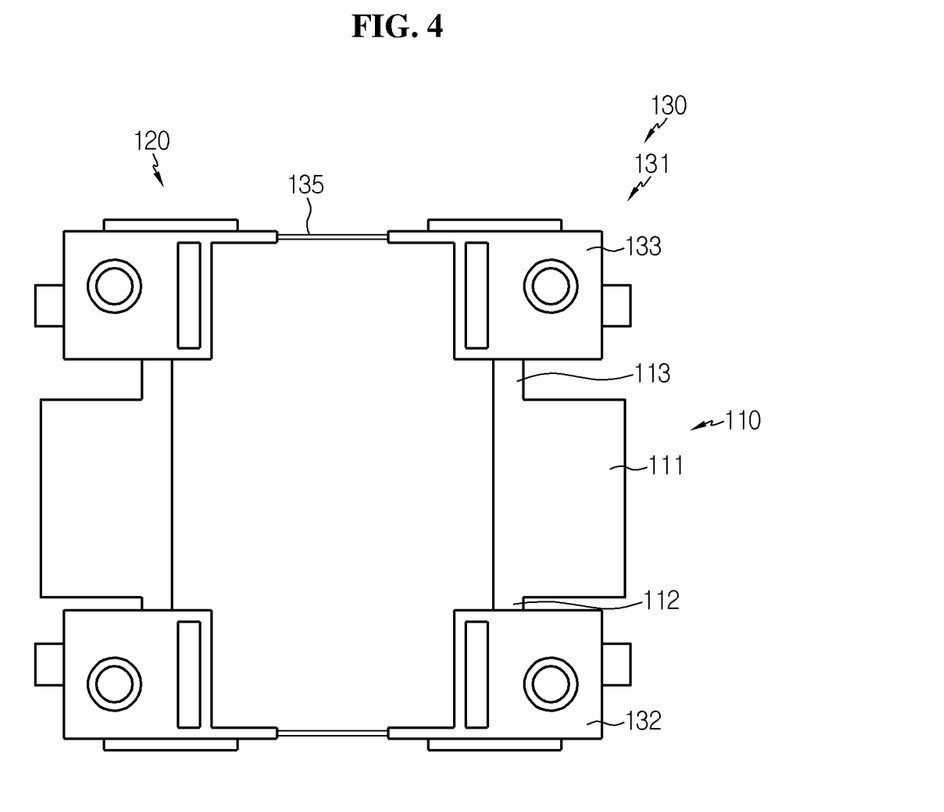
FIG. 4 is a plan view of a battery cell frame according to an embodiment of the present disclosure.
Figure 5:
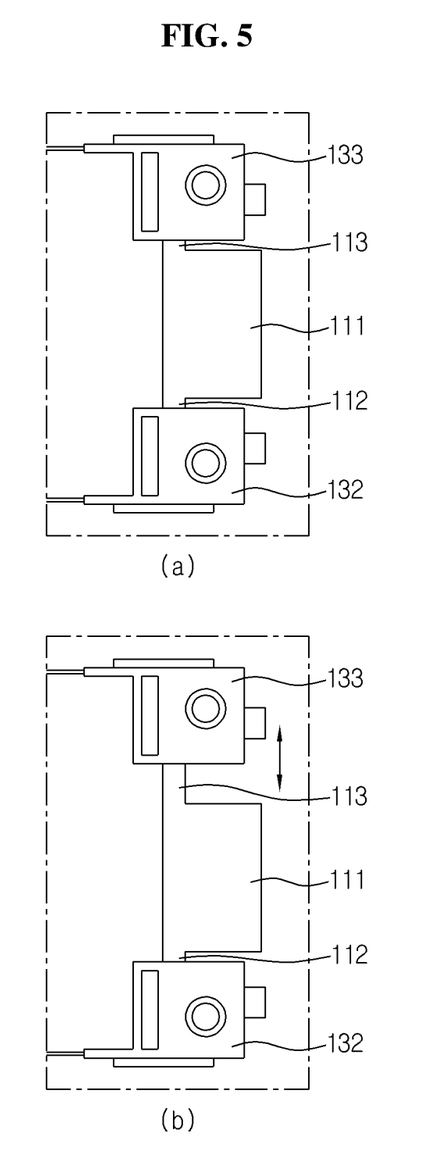
Figure 6:
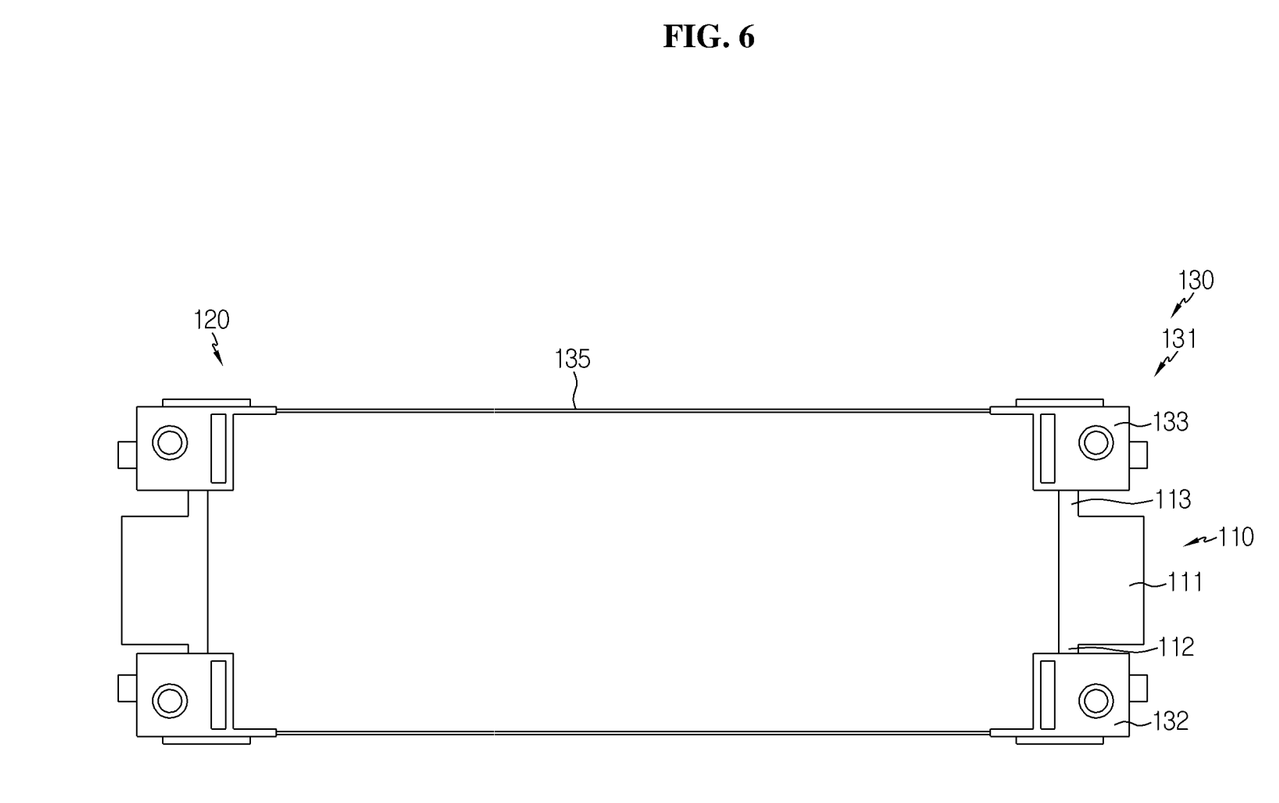
FIG. 6 is a diagram showing a length change by a second variable length part in the battery cell frame of FIG. 4.

FIG. 2 is a full perspective view schematically showing a battery cell coupled to a battery cell frame according to an embodiment of the present disclosure, FIG. 3 is a perspective view showing an electrode lead coupled to a bus bar in the battery cell frame according to an embodiment of the present disclosure, FIG. 4 is a plan view of the battery cell frame according to an embodiment of the present disclosure, FIGS. 5(*a*) and 5(*b*) are diagrams showing a length change by a first variable length part in the battery cell frame of FIG. 4, and FIG. 6 is a diagram showing a length change by a second variable length part in the battery cell frame of FIG. 4.

Referring to FIGS. 2 to 6, the battery cell frame 100 according to an embodiment of the present disclosure includes a bus bar 110, a support member 120 and a variable length part 130.

The bus bar 110 is coupled to the electrode lead 210 provided in the battery cell 200 to electrically connect the electrode lead 210. Here, the electrical connection may include series or parallel. Here, the bus bar 110 may include an electrical connection part 111, a first coupling part 112 and a second coupling part 113 (see FIG. 2). The electrode lead 210 of the battery cell 200 may be coupled to the electrical connection part 111 (see FIG. 3). The electrical connection part 111 may be made of a conductive material, for example, copper, and has a size and a shape corresponding to the size and shape of the electrode lead 210. The first coupling part 112 extends to one side of the electrical connection part 111, and a fixed part 132 of the first variable length part 131 as described below is coupled and fixed to the first coupling part 112. The second coupling part 113 extends to the other side of the electrical connection part 111, and a moveable part 133 of the first variable length part 131 as described below is moveably coupled to the second coupling part 113.

The bus bar 110 may be coupled to the fixed part 132 and the moveable part 133 at various heights on the basis of the height of the fixed part 132 and the moveable part 133. For example, the bus bar 110 may be coupled to the fixed part 132 and the moveable part 133 so that it is disposed at the center of the fixed part 132 and the center of the moveable part 133 on the basis of the height of the fixed part 132 and the moveable part 133, or may be coupled to the fixed part 132 and the moveable part 133 at a location that deviates from the center of the fixed part 132 and the center of the moveable part 133, for example, lower than the center of the fixed part 132 and the center of the moveable part 133, on the basis of the height of the fixed part 132 and the moveable part 133. When the bus bar 110 is disposed at the center of the fixed part 132 and the center of the moveable part 133, or when the bus bar 110 deviates from the center of the fixed part 132 and the center of the moveable part 133, the electrode lead 210 of the battery cell 200 may be stepped and coupled to the bus bar 110 as shown in FIG. 3. When the electrode lead 210 is stepped and coupled to the bus bar 110, it is possible to prevent a short from occurring due to a contact between one electrode lead 210 and another electrode lead 210 in the event that the battery cell frame 100 is stacked upside down when stacking the plurality of battery cells 200 in a battery module 300 as described below.

The support member 120 is coupled to the bus bar 110, and the battery cell 200 comes into contact with the support member 120 to support the battery cell 200. Here, the support member 120 has the variable length part 130 that changes in length to fit the size of the battery cell 200. That results in a beneficial effect on the battery cell frame 100, as battery cells 200 of various sizes can be coupled as a result of the variable length part 130 formed in the support member 120.

The variable length part 130 may include a first variable length part 131 that changes in length in the short side direction of the support member 120, and a second variable length part 135 that changes in length in the long side direction of the support member 120. Here, the support member 120 may include either the first variable length part 131 or the second variable length part 135 or both. The first variable length part 131 may include a fixed part 132 and a moveable part 133. Referring to FIG. 4, the fixed part 132 may be fixedly coupled to one side of the bus bar 110, for example, the first coupling part 112 of the bus bar 110, and the moveable part 133 may be moveably coupled to the other side of the bus bar 110, for example, the second coupling part 113 of the bus bar 110, at a location facing the fixed part 132. That is, referring to FIGS. 5(a) and 5(b), while the fixed part 132 of the first variable length part 131 is fixed to the bus bar 110, only the moveable part 133 of the first variable length part 131 moves, for example, in a straight line along the bus bar 110, so that the length changes to fit the length of the short side of the battery cell 200 (see the arrow in FIG. 5(b)). In another embodiment, the first variable length part 131 may include the moveable part 133 alone with no fixed part 132. Additionally, the second variable length part 135 may be a spiral spring that can shrink and expand by storing energy from rotation or twist. For example, a spiral spring may be provided in the support member 120 to change the length to fit the length of the long side of the battery cell 200 by contraction and expansion in the long side direction of the support member 120. For example, the spiral spring may shrink as shown in FIG. 4, and expand in the long side direction as shown in FIG. 6. The second variable length part 135 is not limited to the spiral spring, and may include various configurations when it can shrink and expand in the long side direction.

Figure 7:
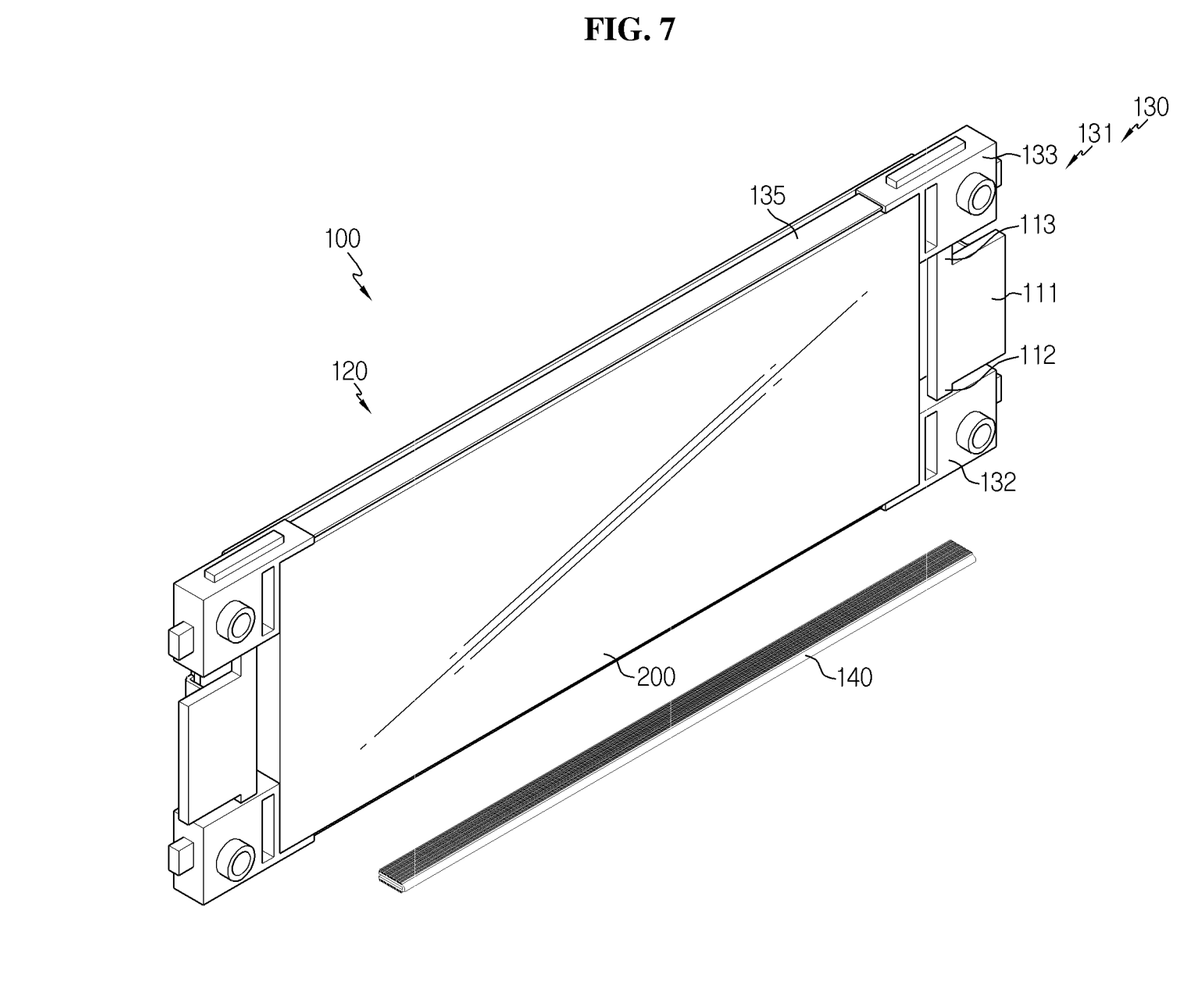
FIG. 7 is a full perspective view showing a thermal interface material separated from the battery cell frame of FIG. 2.
Figure 8:
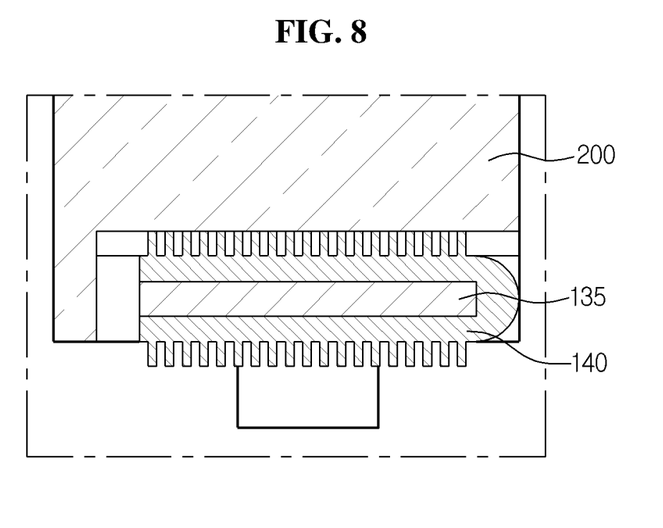
FIG. 8 is a side cross-sectional view showing the thermal interface material coupled to the battery cell frame in FIG. 7.

FIG. 7 is a full perspective view showing a thermal interface material separated from the battery cell frame of FIG. 2, and FIG. 8 is a side cross-sectional view showing the thermal interface material coupled to the battery cell frame in FIG. 7.

To dissipate heat generated from the battery cell 200, the thermal interface material (TIM) 140 may be coupled to the second variable length part 135 to transfer heat, and the thermal interface material 140 may come into direct or indirect contact with the battery cell 200. The conventional frame has a high error ratio because thermal resin is introduced after assembly of the battery cell 200, but in the case of the battery cell frame 100 according to an embodiment of the present disclosure, when the spiral spring is in expanded state, the thermal interface material 140 is coupled to the spiral spring, for example, around at least a portion of the spiral spring, and thus it results in high heat dissipation efficiency and reduced error ratio. Additionally, as shown in FIG. 7, the thermal interface material 140 is cut to the length of the spiral spring in expanded state, and as shown in FIG. 8, the thermal interface material 140 is formed in an approximately 'ㄷ' shape so that it is coupled around the spiral spring of the second variable length part 135, making it easy to install.

Hereinafter, the operation and effect of the battery cell frame 100 according to an embodiment of the present disclosure will be described with reference to the drawings.

Referring to FIGS. 2 to 8, the battery cell frame 100 according to an embodiment of the present disclosure includes the first variable length part 131 that changes in length in the short side direction of the support member 120, and the second variable length part 135 that changes in length in the long side direction of the support member 120, to achieve length adjustments to fit various sizes of the battery cell 200. Here, the first variable length part 131 includes the fixed part 132 that is fixedly coupled to one side of the bus bar 110, and the moveable part 133 that is moveably coupled to the other side of the bus bar 110 at a location facing the fixed part 132 to change the length in the short side direction of the support member 120, and the second variable length part 135 comprises a spiral spring that can shrink and expand to change the length in the long side direction of the support member 120.

Meanwhile, when the spiral spring is in expanded state, the thermal interface material 140 is coupled around at least a portion of the spiral spring, and thus its effects are high heat dissipation efficiency and reduced error ratio.

Figure 9:
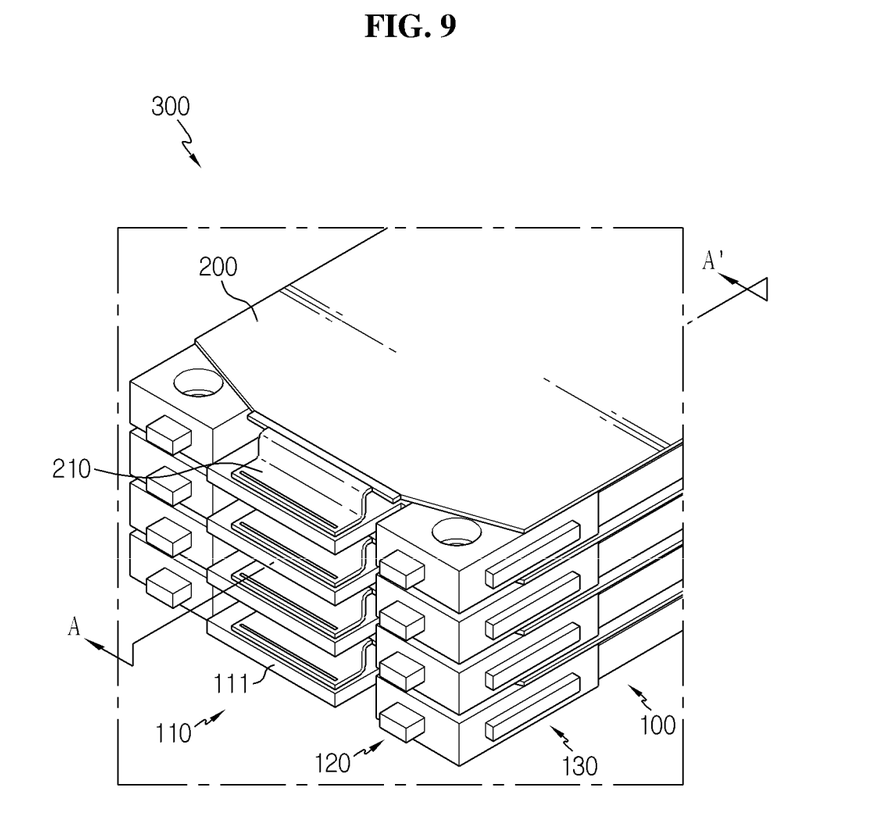
FIG. 9 is a full perspective view schematically showing a battery module according to an embodiment of the present disclosure.
Figure 10:
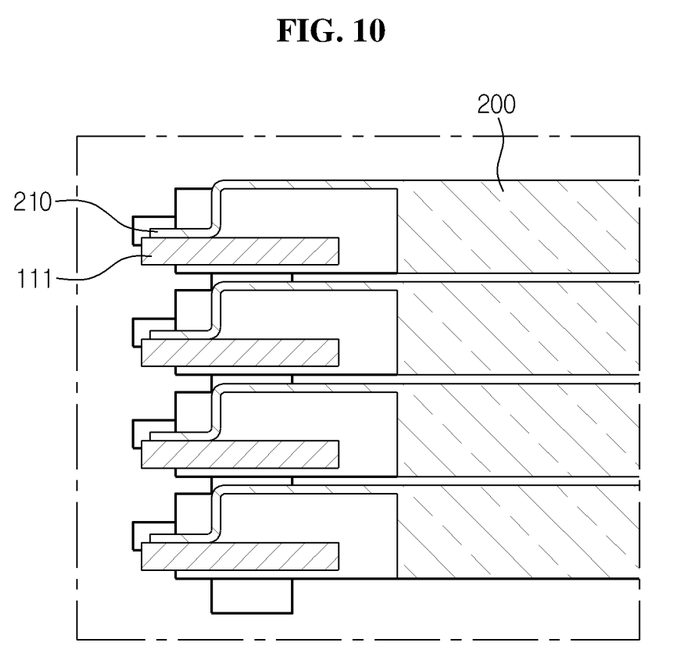
FIG. 10 is a cross-sectional view taken along the line A-A' of FIG. 9.

FIG. 9 is a full perspective view schematically showing the battery module according to an embodiment of the present disclosure, and FIG. 10 is a cross-sectional view taken along the line A-A' of FIG. 9.

Hereinafter, the operation and effect of the battery module 300 according to an embodiment of the present disclosure will be described with reference to the drawings.

In the battery module 300 according to an embodiment of the present disclosure, the electrode lead 210 of the battery cell 200 is electrically coupled to the bus bar 110 of the battery cell frame 100 of the above-described embodiment, and the battery cell 200 is supported in contact with the support member 120 of the battery cell frame 100. Additionally, the plurality of battery cells 200 coupled to the battery cell frame 100 may be stacked on one another to form a battery cell stack.

The battery cell stack may include the plurality of stacked battery cells 200 (see FIGS. 9 and 10). The battery cell 200 may have various structures, and the plurality of battery cells 200 may be stacked in various manners. The battery cell 200 may have a structure in which a plurality of unit cells or a plurality of bi-cells is stacked according to the battery capacity. The plurality of unit cells may each have the following arrangement: positive electrode plate, separator, negative electrode plate. The plurality of bi-cells may each have the following arrangement: positive electrode plate, separator, negative electrode plate, separator, positive electrode plate, separator, negative electrode plate.

The battery cell 200 may have the electrode lead 210. The electrode lead 210 is a sort of terminal that is exposed to the outside and connected to an external device, and may be made of a conductive material. The electrode lead 210 may include a positive electrode lead and a negative electrode lead. The positive electrode lead and the negative electrode lead may be placed in opposite directions along the lengthwise direction of the battery cell 200, or the positive electrode lead and the negative electrode lead may be disposed in the same direction along the lengthwise direction of the battery cell 200. The electrode lead 210 is electrically coupled to a conducting member of the bus bar 110 as described below.

The electrode lead 210 of the battery cell 200 may be stepped and coupled to the bus bar 110 (see FIGS. 9 and 10). As in the above-described embodiment of the battery cell frame 100, that arrangement is aimed at preventing a short from occurring due to contact between one electrode lead 210 and another electrode lead 210 in the event that the battery cell frame 100 is stacked upside down when stacking the plurality of battery cells 200.

Meanwhile, a battery pack (not shown) according to an embodiment of the present disclosure may include at least one battery module 300 according to an embodiment of the present disclosure as described above. Additionally, in addition to the battery module 300, the battery pack (not shown) may further include a case for receiving the battery module 300, and various types of devices for controlling the charge/discharge of the battery module 300, for example, a BMS, a current sensor and a fuse.

Meanwhile, a vehicle (not shown) according to an embodiment of the present disclosure may include the battery module 300 or the battery pack (not shown) as described above, and the battery pack (not shown) may include the battery module 300. Additionally, the battery module 300 according to an embodiment of the present disclosure may be applied to the vehicle (not shown), such as predetermined vehicles (not shown) using electricity, for example, electric vehicles or hybrid electric vehicles.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

INDUSTRIAL APPLICABILITY

The present disclosure relates to a battery cell frame and a battery module including the same, and, in particular, the present disclosure may be applied to industries associated with a secondary battery.

What is claimed is:

1. A battery cell frame comprising:
    a bus bar configured to electrically couple to an electrode lead of a battery cell;
    a support member coupled to the bus bar and configured to come into contact with the battery cell to support the battery cell; and
    a variable length part formed in the support member, the variable length part being configured to change in length to fit a size of the battery cell.

2. The battery cell frame according to claim 1, wherein the variable length part comprises:
    a first variable length part configured to change in length in a short side direction of the support member; and
    a second variable length part configured to change in length in a long side direction of the support member.

3. The battery cell frame according to claim 2, wherein the first variable length part comprises:
    a fixed part fixedly coupled to one side of the bus bar; and
    a moveable part moveably coupled to the other side of the bus bar at a location facing the fixed part.

4. The battery cell frame according to claim 3, wherein the bus bar comprises:
    an electrical connection part configured to couple to the electrode lead of the battery cell is coupled;
    a first coupling part extending to one side of the electrical connection part and coupled to the fixed part; and
    a second coupling part extending to the other side of the electrical connection part coupled to the moveable part.

5. The battery cell frame according to claim 3, wherein, in a height dimension of the fixed part and the moveable part, the bus bar is coupled to the fixed part and the moveable part at a location that is spaced away from a center of the height dimension of the fixed part and moveable part.

6. The battery cell frame according to claim 5, wherein the bus bar is coupled to the fixed part and the moveable part below the center of the height dimension of the fixed part and the moveable part.

7. The battery cell frame according to claim 2, wherein the second variable length part has a spiral spring that can shrink and expand by storing energy from rotation or twist.

8. The battery cell frame according to claim 7, wherein a thermal interface material is coupled to the second variable length part to transfer heat.

9. The battery cell frame according to claim 8, wherein the thermal interface material is coupled to the spiral spring when the spiral spring is in an expanded state.

10. The battery cell frame according to claim 9, wherein the thermal interface material is coupled around at least a portion of the spiral spring.

11. A battery module comprising:
    a plurality of the battery cell frames according to claim 1; and
    a plurality of battery cells each of which is electrically coupled to the bus bar of a respective one of the battery cell frames and which comes into contact with the support member of the respective one of the battery cell frames,
    wherein the plurality of battery cells are stacked on one another.

12. The battery module according to claim 11, wherein an electrode lead of the battery cell has a stepped shape and is coupled to the bus bar.

13. A battery pack comprising the battery module according to claim 11.

14. A vehicle comprising the battery module according to claim 11.

* * * * *